United States Patent
Green

(10) Patent No.: US 10,874,230 B2
(45) Date of Patent: Dec. 29, 2020

(54) SELF-SEALING CAR SEAT BLANKET

(71) Applicant: Capley Blankets, LLC, Lubbock, TX (US)

(72) Inventor: Megan Brian Green, Lubbock, TX (US)

(*) Notice: Subject to any disclaimer, the term of this patent is extended or adjusted under 35 U.S.C. 154(b) by 0 days.

(21) Appl. No.: 16/355,499

(22) Filed: Mar. 15, 2019

(65) Prior Publication Data

US 2019/0282006 A1   Sep. 19, 2019

Related U.S. Application Data

(60) Provisional application No. 62/643,289, filed on Mar. 15, 2018.

(51) Int. Cl.
*A47G 9/06* (2006.01)
*B60N 2/28* (2006.01)

(52) U.S. Cl.
CPC ............ *A47G 9/068* (2013.01); *B60N 2/2881* (2013.01)

(58) Field of Classification Search
CPC .. B60N 2/2881; B60N 2/2806; B60N 2/2812; B60N 2/2803; A47G 9/068; A47G 9/066
USPC .................................................... 297/219.12
See application file for complete search history.

(56) References Cited

U.S. PATENT DOCUMENTS

| | | | | |
|---|---|---|---|---|
| 3,477,065 A | * | 11/1969 | Hoover | A41B 13/06 2/69.5 |
| 4,597,121 A | * | 7/1986 | Bouma | A41B 13/06 2/69 |
| 4,634,618 A | * | 1/1987 | Greer | A47G 9/062 383/127 |
| 4,993,090 A | * | 2/1991 | Ranalli | A47D 15/006 2/69 |
| 5,150,945 A | * | 9/1992 | Aupperlee | A47C 31/11 297/184.13 |
| 5,950,261 A | * | 9/1999 | Hay | A41B 13/06 2/69 |
| 6,145,932 A | * | 11/2000 | Hamel-Nyhus | A47D 15/006 297/219.12 |
| 7,192,086 B2 | * | 3/2007 | Davis | A47C 7/66 297/184.13 |
| D660,070 S | * | 5/2012 | Lugo | D6/611 |
| 8,276,212 B2 | * | 10/2012 | Quintanilla | A41B 13/06 2/48 |
| 9,445,672 B2 | * | 9/2016 | Demosthene | A47C 7/62 |
| D828,703 S | * | 9/2018 | Alley | D6/603 |
| 10,154,743 B1 | * | 12/2018 | Ferguson | A47G 9/023 |
| 2001/0044964 A1 | * | 11/2001 | Phillips | A47G 9/064 5/485 |
| 2008/0079297 A1 | * | 4/2008 | Braxton Perry | B60N 2/28 297/219.12 |

(Continued)

*Primary Examiner* — Milton Nelson, Jr.

(74) *Attorney, Agent, or Firm* — Travis R. Banta; TechLaw Ventures, PLLC

(57) ABSTRACT

This disclosure generally relates to a car seat blanket having one or more slits to accommodate shoulder straps of a car seat and a buckle of a car seat. The slits may include one or more connectors which connect automatically when a child is removed from a car seat. Further, the blanket may include a hood and a foot pocket which may be closed around a child's legs by one or more lengths of ribbon. The blanket may be conveniently rolled and stored by wrapping the ribbon around the blanket and tying a knot in the ribbon.

19 Claims, 4 Drawing Sheets

(56) References Cited

U.S. PATENT DOCUMENTS

2013/0270882 A1\* 10/2013 Mills .................... A47D 15/006
297/219.12

\* cited by examiner

SELF-SEALING CAR SEAT BLANKET

CROSS-REFERENCE TO RELATED APPLICATIONS

This application claims the benefit of U.S. Provisional Application No. 62/643,289, filed Mar. 15, 2018, which is incorporated herein by reference in its entirety, including but not limited to those portions that specifically appear hereinafter, the incorporation by reference being made with the following exception: In the event that any portion of the above-referenced provisional application is inconsistent with this application, this application supersedes said above-referenced provisional application.

BACKGROUND

1. Technical Field

This disclosure relates generally to a device which provides a self-sealing mechanism for blankets. In one embodiment, the blanket includes one or more slits for interfacing with a car seat and which self-seal when removed from a car seat to prevent cold air from entering the blanket during use. The blanket may include a hood pocket for hooding a baby. The blanket may further include a pocket for containing a baby's legs both inside the car seat and outside the car seat.

2. Description of the Related Art

Since the beginning of human life on the planet Earth, the ability to stay warm in most of the world's climates has been a constant struggle for mankind. Man developed clothing and fire to maintain warmth. However, eventually fires go out and clothing that facilitates sleeping tends to be inefficient clothing for working, requiring at least two sets of clothing for different activities. For many people throughout history, a second set of clothing was an unthinkable luxury. Soon, mankind learned from the animals it hunted that fur was key to keeping warm during cold winter nights. Animals that provided food could also provide a fur blanket, once properly tanned, that were used for blankets, boots, hats, and other insulative clothes. As fur became more and more scarce, mankind turned to natural materials to make blankets. Wool, cotton, and linen, were used as raw materials to create insulative blankets in dimensions that were more convenient for use with a bed than fur blankets, and that required substantially less time and effort to construct because cotton, linen, and other fabrics do not require a lengthy tanning process. One additional advantage of blankets made from natural materials is that while the raw materials need to be collected during a particular season (e.g., when cotton blooms it must be harvested at a specific time and sheep must be shorn in the summer to give them time to grow new wool for winter), the raw natural materials could be stored and used throughout the winter to create blankets for the future, unlike fur blankets.

Simple blankets were made essentially using these raw materials as a one-layer sheet of fabric equivalent to what we would know as bedsheets today. However, eventually, natural insulation was added, and warmer synthetic raw materials were created to provide blankets that were more and more insulative. Blanket manufacturing became an art form for many, using embroidery to decorate panels on a quilt, for example, which were sewn together as a quilt top, filled with insulation material, and sewn to a bottom to create a blanket. Insulation materials progressed from straw and fur to goose down, and to synthetic cotton/polyester materials known as "batting." Blanket manufacturers soon realized that with nothing to hold the insulation materials in place, blankets became lumpy as the insulation moved from one side of the blanket to another. To resolve this problem, blanket manufacturers began pinning or "tying" quilts with yarn, for example. A long needle pulling yarn was inserted every few inches to connect the top of the blanket to the back of the blanket and knots were successively tied across the entire width and length of the blanket. Not only did the yarn effectively sew the insulation in place between the top and the bottom of the blanket in place, the connection points served as baffles which created obstructions for the insulation that was not sewn in place and prevented the insulation from moving inside the blanket.

Blankets have been developed for diverse applications. For example, sleeping bags are one type of blanket that are essentially a person sized pocket. Space blankets have been fashioned using thin sheets of metal relying on high heat refractory capabilities, instead of insulation, which reflect a person's body heat back to the person without letting much heat escape. Blankets have been manufactured specifically for receiving babies, called "receiving blankets." Minky blankets have recently become fashionable because of their synthetic fur like softness. While these blankets can be very comfortable, blankets, like many tools, become specifically useful for a particular application and more difficult to use for other applications.

With the fairly recent advent of car seats, and new laws requiring the use of car seats for children between infancy and until a child reaches a particular height and weight, many parents, especially new parents, have struggled to put blankets on babies, especially, while the baby is in a car seat. Infants are particularly sensitive to feeling cold and require time to acclimatize to a new environment outside the womb that is far less confining. Thus, it is frequently desirable to keep an infant snugly wrapped within a receiving blanket, especially in a car seat. Unfortunately, for many parents, the use of a blanket with a car seat is virtually impossible. Either a child is wrapped in a blanket or a child is in a car seat, especially in more recent car seats which use a three-point harness system (two shoulder straps buckled into a buckle disposed between the baby's legs). Many parents place a baby in a car seat, buckle the baby in, and throw a blanket over the top of the car seat, tucking the blanket in around the baby in the car seat. Inevitably, however, the baby kicks or moves which causes the blanket to become untucked and causes the blanket to fall off. The baby becomes cold and starts to cry, and the process of again covering the car seat with the blanket and tucking it in begins again. This difficulty in keeping a child, infants especially, covered with a blanket while in a car seat can become a significant source of exasperation for many parents, which results in parents frequently over-loosening the car seat shoulder straps in an attempt to get the blanket under the shoulder straps, effectively using the straps to hold the blanket in, or buckling the baby into the car seat in a manner that is otherwise inconsistent with the manufacturer's recommended use of the car seat.

Accordingly, it is one object of this disclosure to provide a blanket that overcomes the difficulties of covering a baby in a car seat with a blanket. It is another object of this disclosure to provide one or more self-sealing slots in the blanket to allow access through the blanket to the shoulder straps of the car seat and the buckle of the car seat. It is another object of this disclosure to provide a foot pocket to prevent a baby from kicking the blanket off. It is another object of this disclosure to provide a hood pocket that acts as a hood for a child.

SUMMARY

Disclosed herein is a car seat blanket. The car seat blanket may include one or more slits. The one or more slits may contain one or more connectors disposed along a length of the slit.

BRIEF DESCRIPTION OF THE DRAWINGS

The accompanying drawings illustrate various embodiments of blanket for use with a car seat disclosed herein.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
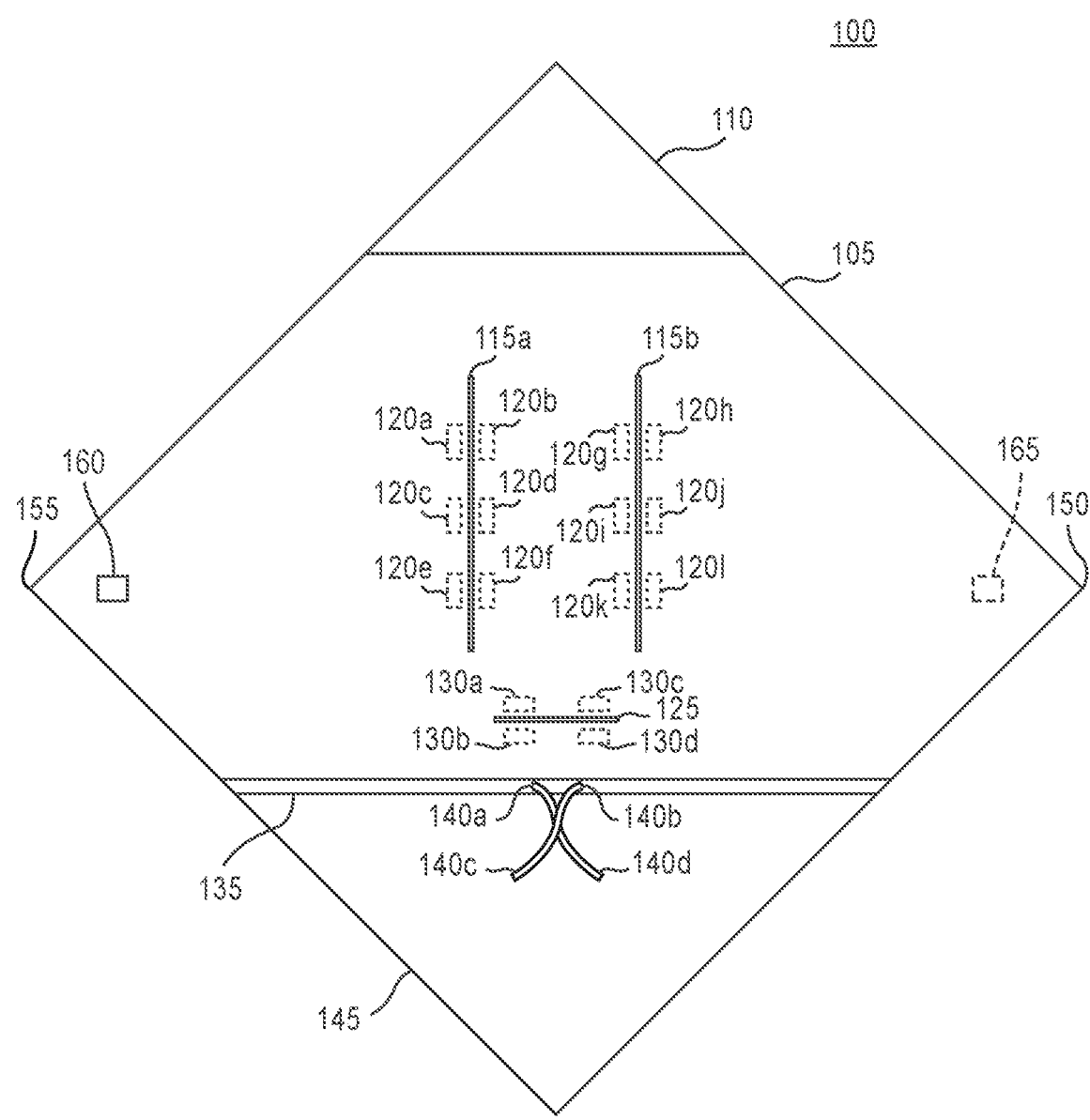
FIG. 1 illustrates an exemplary self-sealing blanket.

FIG. 1 illustrates an exemplary self-sealing blanket 100. Self-sealing blanket 100 includes a blanket 105 that is generally diamond shaped but may be constructed using any suitable shape. Blanket 105 may be constructed using any appropriate natural or synthetic material which serves to insulate a person from a cold environment or weather conditions. Blanket 105 may include a hood 110 which is a pocket that is sewed into blanket 105 at a top corner of blanket 105. Hood 110 may be sized suitably for an age of a child. For example, a blanket intended for an infant may be smaller than a blanket intended for a toddler and a hood for a toddler may unduly encompass the head of an infant. Thus, hood 110 may be appropriately sized to accommodate the heads of most infants or most toddlers.

Blanket 105 further includes slit 115a and slit 115b which serve as vertically oriented holes in blanket 105 that may allow a shoulder strap of a car seat to pass through blanket 105. Slit 115a includes connectors 120a-120f which are implemented as connection points across a length of slit 115a. In one embodiment, connectors 120a-120f may be implemented as magnets such that when a shoulder strap is removed from blanket 105, slit 115a is sealed automatically by magnetic attraction between connectors 120a and 120b, 120c and 120d, and 120e and 120f. While magnets are preferable types of connectors, it is conceivable that other connectors may also be substituted. For example, connectors 120a-120f may be implemented as buttons, snaps, hook and loop connections (wire type or Velcro® brand hook and loop tape), zippers, snap rivets, laces, buckles, or any other connector known in the art. Further, while three sets of connectors 120a-120f are shown in slit 115a, any number of connectors may be implemented to suit a particular purpose. In many embodiments, three sets of connectors may be ideal while in other embodiments, anywhere between 1 and 5 sets of connectors may be appropriate.

Similarly, slit 115b includes connectors 120g-120l which are implemented as connection points across a length of vertically oriented slit 115b. Slit 115b may also be parallel to slit 115a. In one embodiment, connectors 120g-120l may be implemented as magnets such that when a shoulder strap is removed from blanket 105, slit 115b is sealed automatically by magnetic attraction between connectors 120g and 120h, 120i and 120j, and 120k and 120l. While magnets are preferable types of connectors, it is conceivable that other connectors may also be substituted. For example, connectors 120g-120l may be implemented as buttons, snaps, hook and loop connections (wire type or Velcro® brand hook and loop tape), zippers, snap rivets, laces, buckles, or any other connector known in the art. Further, while three sets of connectors 120g-120l are shown in slit 115b, any number of connectors may be implemented to suit a particular purpose. In many embodiments, three sets of connectors may be ideal while in other embodiments, anywhere between 1 and 5 sets of connectors may be appropriate.

Blanket 105 may further include a horizontally oriented slit 125 which serves as a hole in blanket 105 that may allow a buckle of a car seat to pass through blanket 105. Slit 125 includes connectors 130a-130d which are implemented as connection points across a length of slit 125. In one embodiment, connectors 130a-130d may be implemented as magnets such that when the car seat buckle is removed from blanket 105, slit 125a is sealed automatically by magnetic attraction between connectors 130a and 130b and 130c and 130d. While magnets are preferable types of connectors, it is conceivable that other connectors may also be substituted. For example, connectors 130a-130d may be implemented as buttons, snaps, hook and loop connections (wire type or Velcro® brand hook and loop tape), zippers, snap rivets, laces, buckles, or any other connector known in the art. Further, while two sets of connectors 130a-130d are shown in slit 125, any number of connectors may be implemented to suit a particular purpose. In many embodiments, three sets of connectors may be ideal while in other embodiments, anywhere between 1 and 5 sets of connectors may be appropriate.

Blanket 105 may further include a cordage recess portion 135 which may include a recess within which are disposed cordage 140c and cordage 140d which may emerge from cordage recess portion 135 at openings 140a and 140b, respectively. In one embodiment, cordage 140c and cordage 140d may be implemented as ribbon material, twisted nylon or cotton rope, woven nylon or cotton rope (e.g., shoelace material), or any other cordage that may be connected to blanket 105 within cordage recess portion 135. Cordage recess portion 135 refers to a recess which contains a portion of cordage 140*c* and cordage 140*d* and within which cordage 140*c* and 140*d* may be connected to blanket at, for example, an edge of blanket 135. In this manner, cordage 140*c* and cordage 140*d* may be drawn through openings 140*a* and 140*b* to effectively gather blanket 105 into a pocket 145 at a bottom of blanket 105. Alternatively, cordage recess portion 135 may create a recess that encircles blanket 105 about an axis defined by pocket 145 in which a continuous length of cordage is disposed having ends 140*c* and 140*d*. Cordage 140*c* and cordage 140*d* may be tied together using a bow knot, or another knot, to ensure that pocket 145 stays in a closed position until it the knot is untied, as will be further discussed below.

Blanket 105 further includes a first corner 150 and a second corner 155 which may be wrapped one over the other to enclose a child within blanket 105. In one embodiment, a connector 165 may connect second corner 155, for example, to blanket 105 when first corner 150 is wrapped underneath second corner 155 to prevent second corner 155 from falling off blanket 105. For example, when first corner 150 is folded in, second corner 150 may use hook and loop connector tape 165, for example, to attach to a corresponding portion of hook and loop connector tape 165 disposed on a back side connector 160 of blanket 105. Such a connector 160 may serve to keep second corner 155 wrapped over a child buckled into a car seat, for example.

Figure 2:
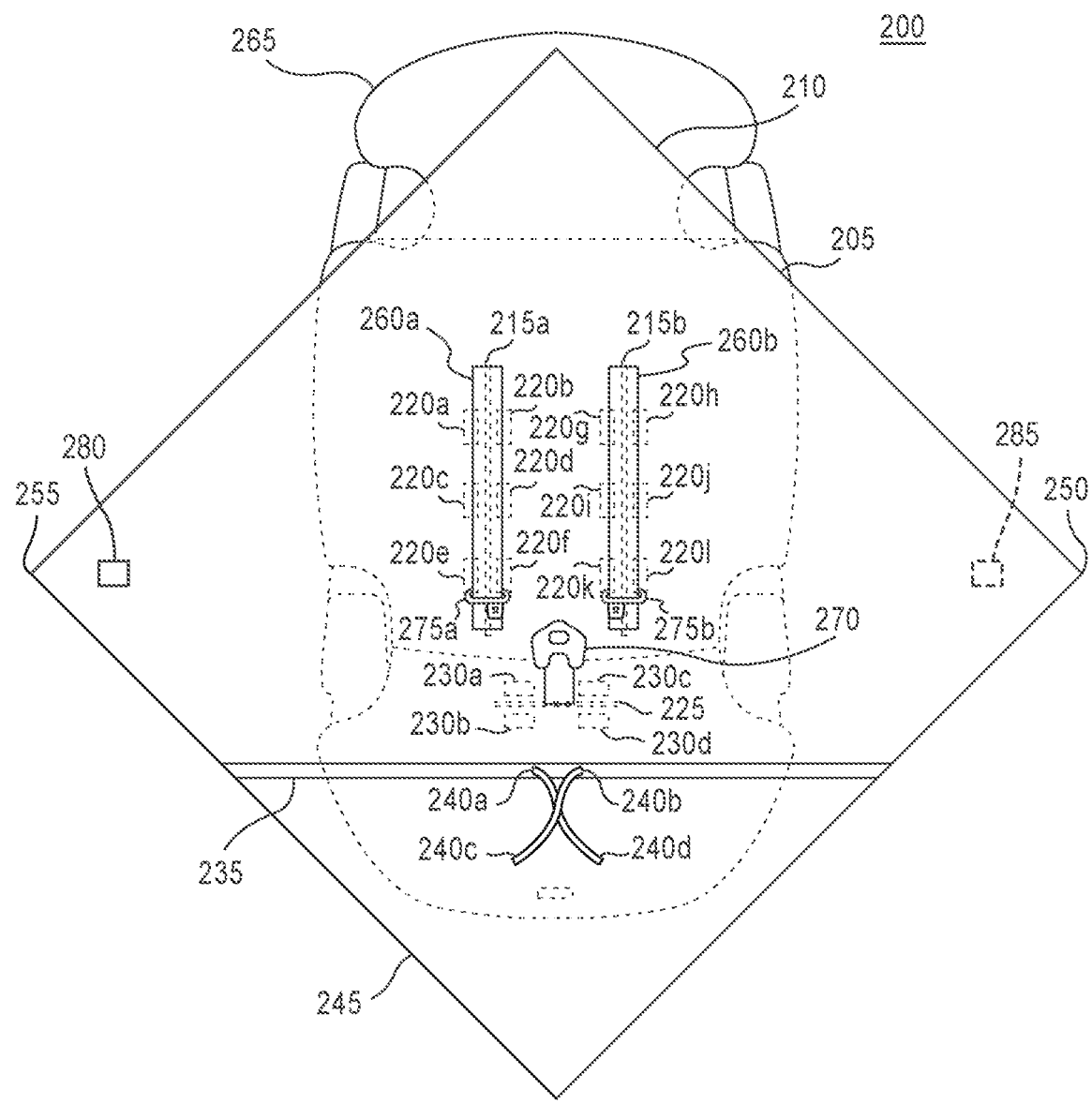
FIG. 2 illustrates the exemplary self-sealing blanket in use with a car seat.

FIG. 2 illustrates the exemplary self-sealing blanket 200 in use with a car seat 265. Self-sealing blanket 200 includes a blanket 205 that is generally diamond shaped but may be constructed using any suitable shape. As before, blanket 205 may be constructed using any appropriate natural or synthetic material which serves to insulate a person from a cold environment or weather conditions. Blanket 205 may include a hood 210 which is a pocket that is sewed into blanket 205 at a top corner of blanket 205. Hood 210 may be sized suitably for an age of a child. For example, a blanket intended for an infant may be smaller than a blanket intended for a toddler and a hood for a toddler may unduly encompass the head of an infant. Thus, hood 210 may be appropriately sized to accommodate the heads of most infants or most toddlers.

Blanket 205 further includes slit 215*a* and slit 215*b* which serve as vertically oriented holes in blanket 205 that may allow a shoulder strap of a car seat to pass through blanket 205. Slit 215*a* includes connectors 220*a*-220*f* which are implemented as connection points across a length of slit 215*a*. In one embodiment, connectors 220*a*-220*f* may be implemented as magnets such that when a shoulder strap 260*a* is removed from blanket 205, slit 215*a* is sealed automatically by magnetic attraction between connectors 220*a* and 220*b*, 220*c* and 220*d*, and 220*e* and 220*f*. While magnets are preferable types of connectors, it is conceivable that other connectors may also be substituted. For example, connectors 220*a*-220*f* may be implemented as buttons, snaps, hook and loop connections (wire type or Velcro® brand hook and loop tape), zippers, snap rivets, laces, buckles, or any other connector known in the art. Further, while three sets of connectors 220*a*-220*f* are shown in slit 215*a*, any number of connectors may be implemented to suit a particular purpose. In many embodiments, three sets of connectors may be ideal while in other embodiments, anywhere between 1 and 5 sets of connectors may be appropriate.

Shoulder strap 260*a* and first buckle tongue 275*a* may be inserted through slit 215*a* in blanket 205. Shoulder strap 260*a* and first buckle tongue 275*a*, which is disposed thereon, are intended to hold a child into a car seat by installing shoulder strap 260*a* over the child's right shoulder. First buckle tongue 275*a* is intended to couple with a car seat buckle 270 which is disposed between the child's legs within car seat 265. In this manner, shoulder strap 260*a* comes over the right shoulder of the child and meets buckle 270 at, approximately, an abdomen of a child, effectively restraining the child within car seat 265.

Similarly, slit 215*b* includes connectors 220*g*-220*l* which are implemented as connection points across a length of slit 215*b*. In one embodiment, connectors 220*g*-220*l* may be implemented as magnets such that when a shoulder strap 260*b* is removed from blanket 205, slit 215*b* is sealed automatically by magnetic attraction between connectors 220*g* and 220*h*, 220*i* and 220*j*, and 220*k* and 220*l*. While magnets are preferable types of connectors, it is conceivable that other connectors may also be substituted. For example, connectors 220*g*-220*l* may be implemented as buttons, snaps, hook and loop connections (wire type or Velcro® brand hook and loop tape), zippers, snap rivets, laces, buckles, or any other connector known in the art. Further, while three sets of connectors 220*g*-220*l* are shown in slit 215*b*, any number of connectors may be implemented to suit a particular purpose. In many embodiments, three sets of connectors may be ideal while in other embodiments, anywhere between 1 and 5 sets of connectors may be appropriate.

Shoulder strap 260*b* and second buckle tongue 275*b* may be inserted through slit 215*b* in blanket 205. Shoulder strap 260*b* and second buckle tongue 275*b*, which is disposed thereon, are intended to hold a child into a car seat by installing shoulder strap 260*b* over the child's left shoulder. Second buckle tongue 275*b* is intended to couple with a car seat buckle 270 which is disposed between the child's legs within car seat 265. In this manner, shoulder strap 260*b* comes over the left shoulder of the child and meets buckle 270 at, approximately, an abdomen of a child, effectively restraining the child within car seat 265. When shoulder strap 260*a* and shoulder strap 260*b* are connected via first buckle tongue 265*a* and second buckle tongue 265*b* to buckle 270, a three-point harness is formed to restrain the child within car seat 265. It should be noted that the blanket disclosed herein may have applications other than car seats specifically. For example, strollers may include a three-point harness for keeping babies in the stroller. Blanket 205 may be used with any device that includes a three-point harness.

Blanket 205 may further include a slit 225 which serves as a horizontally oriented hole in blanket 205 that may allow buckle 270 of car seat 265 to pass through blanket 205. Slit 225 includes connectors 230*a*-230*d* which are implemented as connection points across a length of slit 225. In one embodiment, connectors 230*a*-230*d* may be implemented as magnets such that when the car seat buckle is removed from blanket 205, slit 225*a* is sealed automatically by magnetic attraction between connectors 230*a* and 230*b* and 230*c* and 230*d*. While magnets are preferable types of connectors, it is conceivable that other connectors may also be substituted. For example, connectors 230*a*-230*d* may be implemented as buttons, snaps, hook and loop connections (wire type or Velcro® brand hook and loop tape), zippers, snap rivets, laces, buckles, or any other connector known in the art. Further, while two sets of connectors 230*a*-230*d* are shown in slit 225, any number of connectors may be implemented to suit a particular purpose. In many embodiments, three sets of connectors may be ideal while in other embodiments, anywhere between 1 and 5 sets of connectors may be appropriate.

Blanket 205 may further include a cordage recess portion 235 which may include a recess within which are disposed cordage 240c and cordage 240d which may emerge from cordage recess portion 235 at openings 240a and 240b, respectively. In one embodiment, cordage 240c and cordage 240d may be implemented as ribbon material, twisted nylon or cotton rope, woven nylon or cotton rope (e.g., shoelace material), or any other cordage that may be connected to blanket 205 within cordage recess portion 235. Cordage recess portion 235 refers to a recess which contains a portion of cordage 240c and cordage 240d and within which cordage 240c and 240d may be connected to blanket at, for example, an edge of blanket 235 In this manner, cordage 240c and cordage 240d may be drawn through openings 240a and 240b to effectively gather blanket 205 into a pocket 245 at a bottom of blanket 205. Alternatively, cordage recess portion 235 may create a recess that encircles blanket 205 about an axis defined by pocket 245 in which a continuous length of cordage is disposed having ends 240c and 240d. Cordage 240c and cordage 240d may be tied together using a bow knot, or another knot, to ensure that pocket 245 stays in a closed position until it the knot is untied, as will be further discussed below.

Blanket 205 further includes a first corner 250 and a second corner 255 which may be wrapped one over the other to enclose a child within blanket 205. In one embodiment, connector 285 may connect second corner 255 to blanket 205 when first corner 250 is wrapped underneath second corner 255 to prevent second corner 255 from falling off blanket 205. For example, when first corner 250 is folded in, second corner 250 may use hook and loop connector tape 285, for example, to attach to a corresponding portion of hook and loop connector tape disposed on a back side connector 280 of blanket 205. Such a connector 280 may serve to keep second corner 255 wrapped over a child buckled into a car seat, for example.

One advantage of blanket 205 is that a child may be safely protected by car seat 265 in the manner intended by the car seat manufacturer while also being comforted and warmed by blanket 205. Slits 215a, 215b, and 225 allow shoulder straps 260a, 260b and buckle 270, respectively, to pass through blanket 205 which allows a blanket to be positioned underneath the child when the child is disposed within car seat 265. Further, hood 210 serves to keep excessive light out of a child's eyes while foot pocket 245 serves to ensure that the child cannot kick excessively and knock blanket 205 off of the child. Once first corner 250 is installed over a child and second corner 255 is installed over first corner 250 (i.e., overwraps the child), the child may be snugly contained within both car seat 265 and self-sealing blanket 200.

An additional advantage is that when it becomes time to remove the child from car seat 265, it becomes a simple task of unbuckling first buckle tongue 265a and second buckle tongue 265b from buckle 270 and lifting the child out of car seat 265 while the child is still in the blanket. In other words, instead of lifting the child out and then recovering the child with a blanket as has been done conventionally, the blanket may come out of car seat 265 with the child, ensuring that the blanket is over the child during the entirety of the process. Further, connectors 220a-220l may automatically magnetically connect to each other, as shoulder strap 260a and shoulder strap 260b are withdrawn through slit 215a and slit 215b, respectively, to self-seal slit 215a and 215b to ensure that wind, cold air, water, snow, or other meteorological conditions are not allowed to penetrate slit 215a and slit 215b. Similarly, connectors 230a-230d may also automatically magnetically connect to each other as buckle 270 is withdrawn through slit 225 to self-seal slit 225 and ensure that wind, cold air, water, snow, or other meteorological conditions are not allowed to penetrate slit 225. While other connectors discussed above may be suitable as connectors 230a-230d, many of these connectors, while functional and useful, are less desirable because they require manual connection and will not automatically close, or self-seal slit 215a, slit 215b, and slit 225, on their own. Thus, one distinct advantage of blanket 200 is that slit 215a, slit 215b and slit 225 are provided when convenient to comfortably buckle a child in a car seat and cover the child with a blanket while in the car seat while also automatically sealing when the child is removed from the car seat. In this manner, a child may be comfortably transported from one place to another while both wrapped in a blanket and disposed within a car seat.

Figure 3:
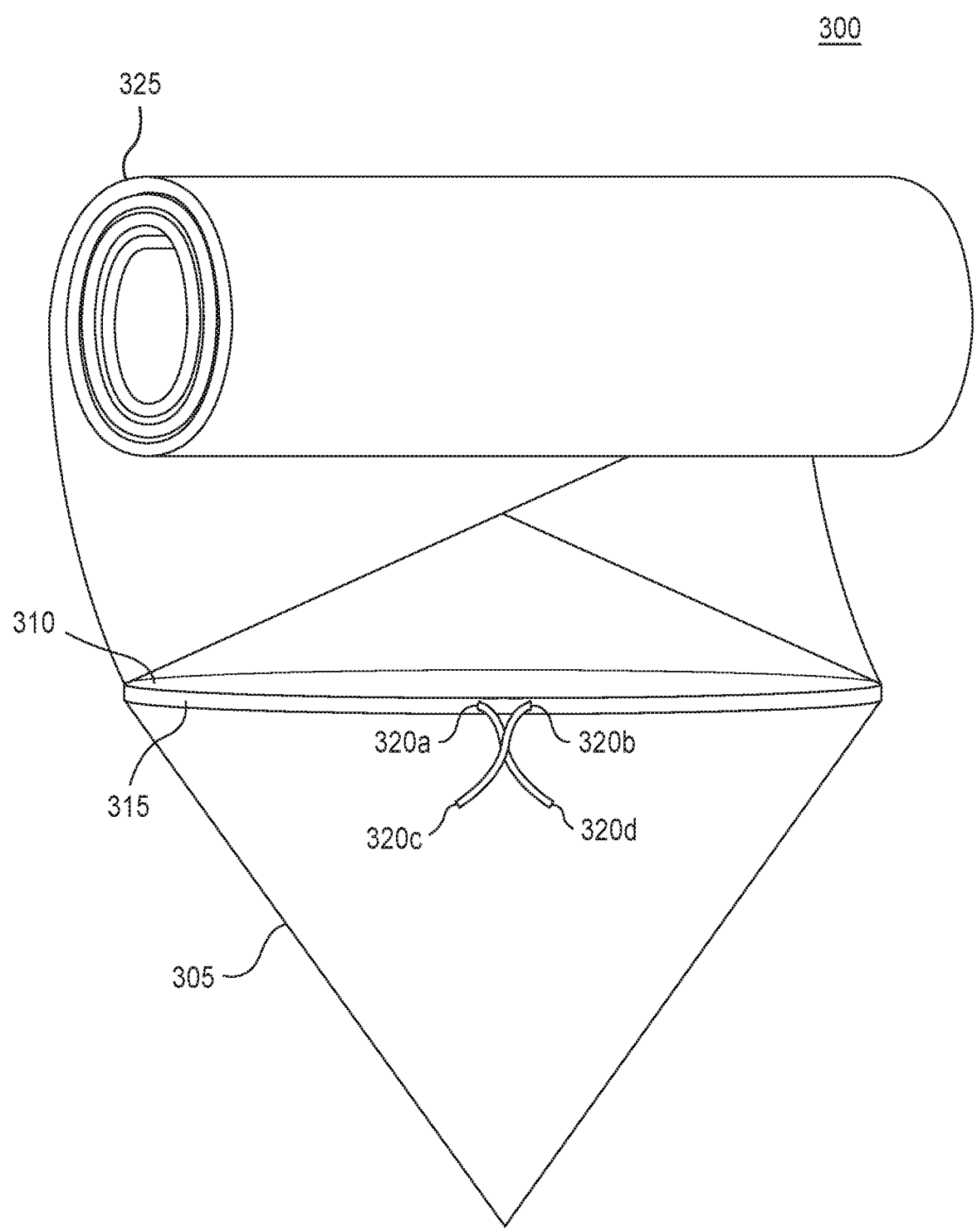
FIG. 3 illustrates an exemplary storage preparation condition for the self-sealing blanket

FIG. 3 illustrates an exemplary storage preparation condition for self-sealing blanket 300. Self-sealing blanket 300 may be similar in implementation and description to self-sealing blanket shown in FIG. 2 and self-sealing blanket 100, shown in FIG. 1. Self-sealing blanket 300 may include blanket 305 which includes a pocket 310. Pocket 310 is similar in implementation and description to, for example, pocket 245, shown in FIG. 2. Pocket 310 may include a cordage recess portion 315 which contains cordage 320c and cordage 320d inside blanket 305 and connects cordage 320c and cordage 320d to blanket 305. Cordage 320c and cordage 320d may exit cordage recess portion 315 at opening 320a and opening 320b. In one embodiment, cordage 320c and cordage 320d may be implemented as ribbon material.

As shown in FIG. 3, blanket 305, with the exception of pocket 310, has been rolled. For example, hood 110 shown in FIG. 1, first corner 150, and second corner 155 have been folded in a manner to form the top three corners of blanket 500 into a square of approximate length as a length of pocket 310 and rolled into a roll 325. When it is desirable to store blanket 305, roll 325 may be rolled into pocket 310 and contained within pocket 310 as a convenient storage. In one embodiment, as will be described below, cordage 320c and cordage 320d may be tied around pocket 310 containing roll 325 to ensure that blanket 305 remains in a rolled condition.

Figure 4:
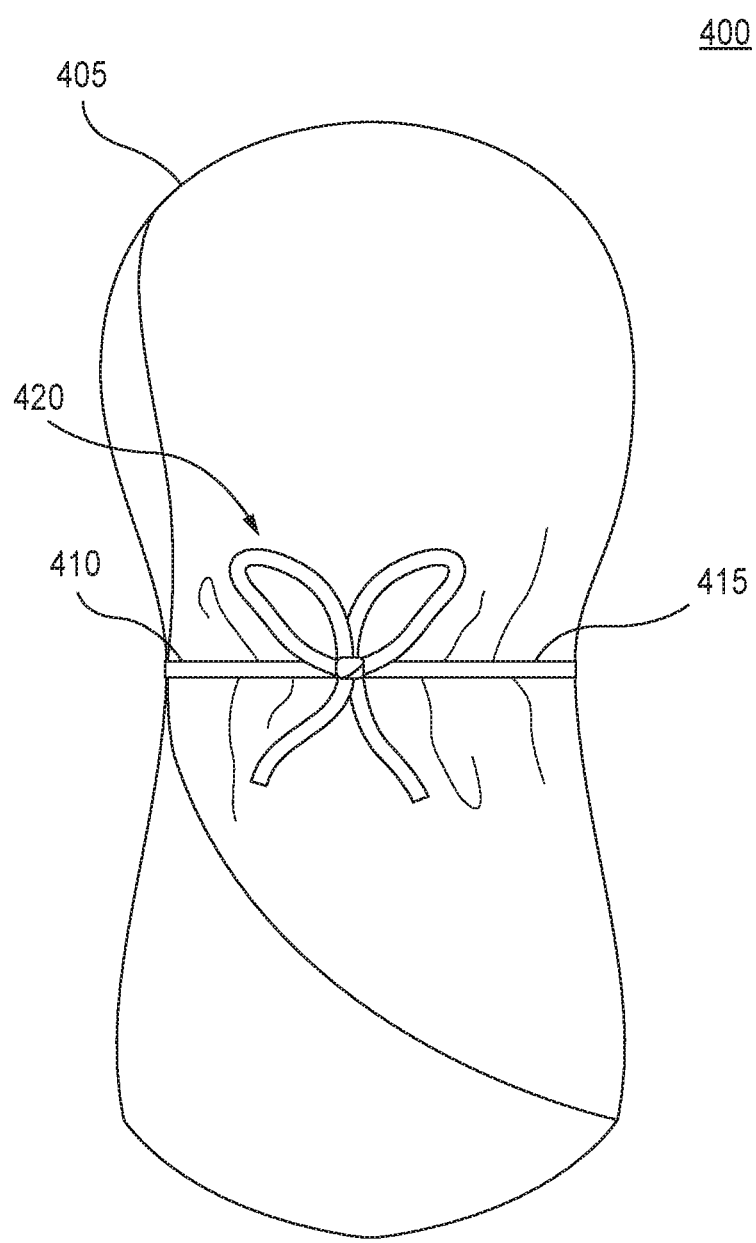
FIG. 4 illustrates an exemplary storage condition for the self-sealing blanket.

FIG. 4 illustrates an exemplary storage condition for the self-sealing blanket 400. As discussed with respect to FIG. 3, self-sealing blanket 400 may be rolled for convenient storage when not in active use. As shown in FIG. 4, self-sealing blanket 400 may include a blanket 405 which is similar in implementation and description to blanket 105 shown in FIG. 1, blanket 205 shown in FIG. 2, and blanket 305 shown in FIG. 3, has been rolled as described with respect to FIG. 3, above. Cordage 410 and cordage 415, which are similar in implementation and description to cordage 140a and 140b shown in FIG. 1, cordage 240a and 240b shown in FIG. 2, and cordage 320a and 320b shown in FIG. 3, has been tied around blanket 405 in a bow knot 420, effectively securing blanket 405 within pocket 310, shown in FIG. 3. Self-sealing blanket 400 may be so stored in a convenient manner.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A car seat blanket including one or more slits, wherein each of the one or more slits contains one or more magnets disposed along a length of the one or more slits,
   wherein the car seat blanket further includes a pocket disposed within a body of the car seat blanket, the pocket including cordage positioned in the pocket to gather the pocket when the cordage is drawn together,
   wherein the cordage is positioned perpendicularly to at least one of the one or more slits,
   wherein the car seat blanket further includes a hood disposed within the body of the blanket, and
   wherein one or more connectors are located at opposing corners of the car seat blanket.

2. The car seat blanket of claim 1, wherein the one or more slits are oriented vertically relative to shoulder straps in a car seat.

3. The car seat blanket of claim 1, wherein one of the one or more slits is oriented perpendicularly relative to shoulder straps in a car seat.

4. The car seat blanket of claim 3, wherein the another slit provides access for a car seat buckle to be inserted through the another slit.

5. The car seat blanket of claim 3, wherein the another slit contains one or more magnets disposed along a length of the slit.

6. The car seat blanket of claim 1, wherein the hood is located at a top corner of the car seat blanket.

7. The car seat blanket of claim 1, wherein the car seat blanket further provides a cordage recess in the pocket.

8. The car seat blanket of claim 7, wherein the cordage is disposed within the cordage recess in the pocket.

9. The car seat of claim 7, wherein an opening of the pocket is surrounded by the cordage recess.

10. The car seat of claim 9, wherein the pocket may be closed by drawing the cordage through the cordage recess.

11. The car seat of claim 9, wherein the pocket is disposed on the car seat blanket opposite the hood disposed on the car seat blanket.

12. The car seat blanket of claim 1, wherein the car seat blanket is a diamond shape having a first corner, a second corner, a third corner, and a fourth corner.

13. The car seat blanket of claim 12, wherein the third corner and fourth corner are connectable.

14. The car seat blanket of claim 12, wherein the hood is disposed in the first corner of the car seat blanket.

15. The car seat blanket of claim 12, wherein the pocket is disposed in the second corner of the car seat blanket.

16. The car seat blanket of claim 12, wherein the first corner and second corner are disposed on opposite sides of the car seat blanket.

17. The car seat blanket of claim 1, wherein the one or more slits accommodate a car seat buckle to be disposed through the slit with a car seat shoulder strap.

18. The car seat blanket of claim 1, wherein the car seat blanket is containable within the pocket and securable with the cordage disposed in a cordage recess that surrounds the pocket.

19. A car seat blanket comprising:
   a hood disposed within a body of the car seat blanket,
   a pocket disposed within a body of the car seat blanket,
   wherein the hood is disposed on one end and the pocket is disposed on another end,
   wherein the hood is disposed on an end that is opposite the end where the pocket is disposed on a first set of opposite ends of the car seat blanket,
   two connectors disposed within the body of a blanket, the first connector is disposed on one end and the second connector is disposed on another end, each connector is disposed on an opposite end of each other on a second set of opposite ends of the car seat blanket,
   one or more slits,
   wherein the pocket further contains cordage that is positioned perpendicularly to at least one of the one or more slits, and
   wherein the one or more slits include one or more magnet connectors disposed along a length of the one or more slits.

* * * * *